United States Patent
Seo et al.

(10) Patent No.: US 11,864,134 B2
(45) Date of Patent: *Jan. 2, 2024

(54) NEW RADIO (NR) AND LONG TERM EVOLUTION (LTE) SIGNAL CONCURRENT TESTING

(71) Applicant: VIAVI SOLUTIONS INC., Chandler, AZ (US)

(72) Inventors: Seung-Wan Seo, Gyeonggi-Do (KR); Hyuck In Kwon, Gyeonggi-Do (KR); Jae-Gab Lee, Gyeonggi-Do (KR); Jin-Ook Kim, Seoul (KR)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,951

(22) Filed: Oct. 28, 2022

(65) Prior Publication Data

US 2023/0047745 A1    Feb. 16, 2023

Related U.S. Application Data

(63) Continuation of application No. 17/360,729, filed on Jun. 28, 2021, now Pat. No. 11,516,759.

(51) Int. Cl.
*H04W 56/00* (2009.01)

(52) U.S. Cl.
CPC .................. *H04W 56/001* (2013.01)

(58) Field of Classification Search
CPC .................................................. H04W 56/001
See application file for complete search history.

(56) References Cited

U.S. PATENT DOCUMENTS

| | | | |
|---|---|---|---|
| 2021/0306241 A1* | 9/2021 | Ramalingam | H04L 43/0888 |
| 2021/0314852 A1* | 10/2021 | Park | H04W 88/06 |
| 2021/0321234 A1* | 10/2021 | Khoryaev | H04W 56/0015 |
| 2021/0368328 A1* | 11/2021 | Gao | H04W 24/10 |

* cited by examiner

*Primary Examiner* — Kyaw Z Soe
(74) *Attorney, Agent, or Firm* — Mannava & Kang, P.C.

(57) ABSTRACT

According to examples, NR and LTE signal concurrent testing may include ascertaining LTE synchronization data associated with an LTE signal, and ascertaining NR synchronization data associated with an NR signal. The NR and LTE signal concurrent testing may further include performing, for the LTE synchronization data, LTE analysis, and performing, for the NR synchronization data, NR analysis. Based on the LTE analysis and the NR analysis, a multi-path profile of the LTE signal and the NR signal may be determined.

20 Claims, 14 Drawing Sheets

NEW RADIO (NR) AND LONG TERM EVOLUTION (LTE) SIGNAL CONCURRENT TESTING

PRIORITY

The present application is a Continuation under 35 U.S.C. § 120 of co-pending U.S. patent application Ser. No. 17/360,729, filed on Jun. 28, 2021, the disclosure of which is hereby incorporated by reference in its entirety.

BACKGROUND

With respect to signal propagation, multipath may represent a phenomenon of fluctuations in signal strength formed by incoherent combinations of signals originating from different directions through reflection or scattering of a direct signal. The signals that are reflected or scattered may include different amplitudes and phases compared to the signal that is received directly.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
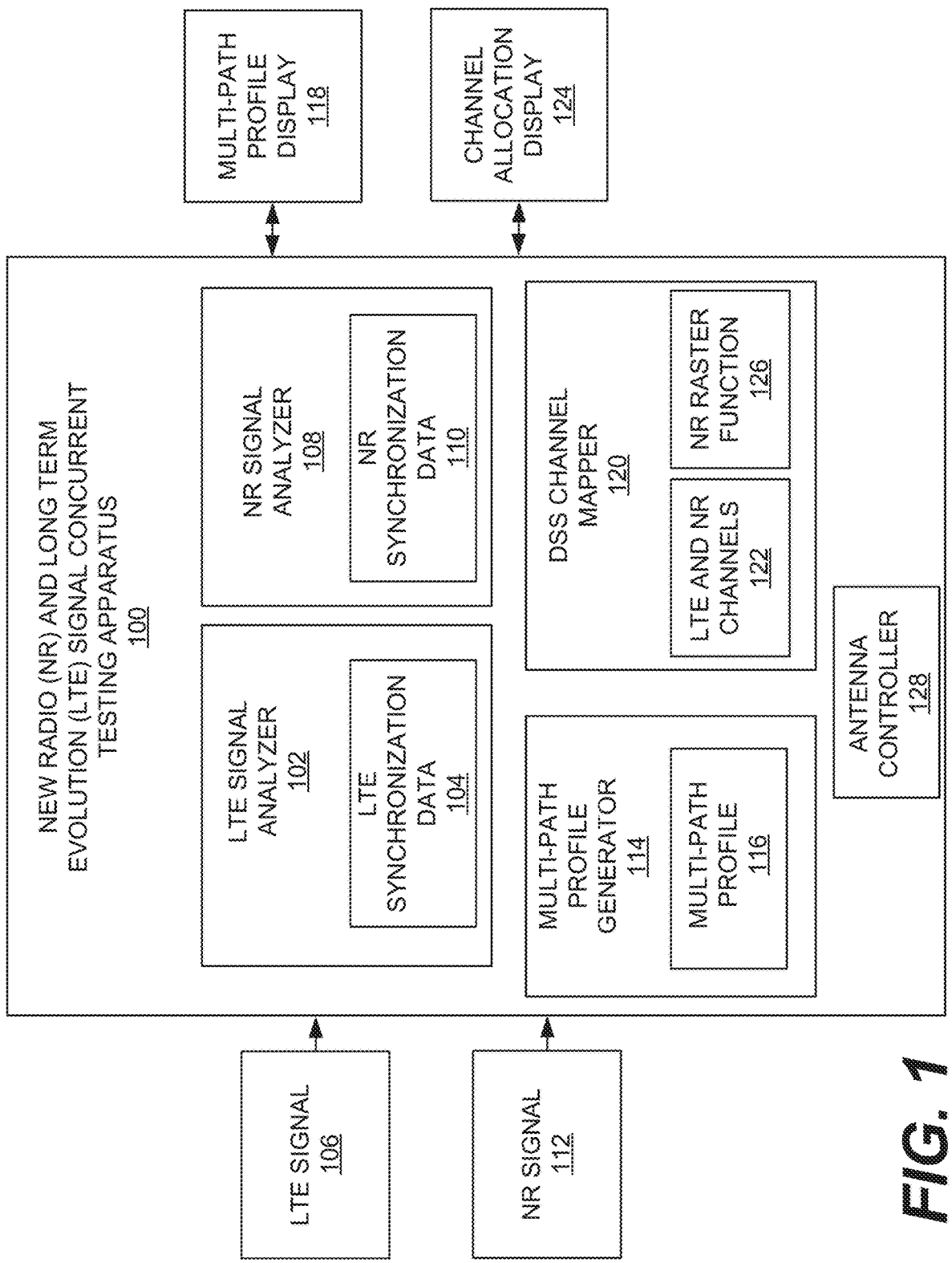
FIG. 1 illustrates a block diagram of a New Radio (NR) and Long Term Evolution (LTE) signal concurrent testing apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

NR and LTE signal concurrent testing apparatuses, methods for NR and LTE signal concurrent testing, and non-transitory computer readable media having stored thereon machine readable instructions to provide NR and LTE signal concurrent testing are disclosed herein. The apparatuses, methods, and non-transitory computer readable media disclosed herein may implement a multipath profile operation to measure the time variation and power level of a multiple path propagated signal. Further, by using the multipath profile operation, the apparatuses, methods, and non-transitory computer readable media disclosed herein may determine a multipath number and time relationship.

A multipath signal may include a direct path, but in some cases, the signal may also include various forms, such as a reflections of buildings. In this regard, when measuring a multipath signal, a delay may exceed 4.68 µs. In this case, a direction of an antenna of a base station may need to be changed to reduce the delay time. For example, a direction of an antenna of a base station may be changed until a delay is less than or equal to 4.68 µs, which may indicate an acceptable base station direction.

A multipath signal may include an LTE component and an NR component. These components may need to be evaluated to determine a delay time value. In this regard, it is technically challenging to simultaneously evaluate the LTE component and the NR component to determine the delay time value.

The apparatuses, methods, and non-transitory computer readable media disclosed herein address at least the aforementioned technical challenges by ascertaining LTE synchronization data associated with an LTE signal, and ascertaining NR synchronization data associated with an NR signal. The apparatuses, methods, and non-transitory computer readable media disclosed herein address may further include performing, for the LTE synchronization data, LTE analysis, and performing, for the NR synchronization data, NR analysis. Based on the LTE analysis and the NR analysis, a multi-path profile of the LTE signal and the NR signal may be determined.

Further, the apparatuses, methods, and non-transitory computer readable media disclosed herein may address at least the aforementioned technical challenges by performing, for the LTE synchronization data, a further LTE analysis, and performing, for the NR synchronization data, a further NR analysis. Further, the apparatuses, methods, and non-transitory computer readable media disclosed herein may determine, based on the further LTE analysis and the further NR analysis, LTE and NR channels.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example NR and LTE signal concurrent testing apparatus (hereinafter also referred to as "apparatus 100").

Referring to FIG. 1, the apparatus 100 may include an LTE signal analyzer 102 that is executed by at least one hardware processor (e.g., the hardware processor 602 of FIG. 6, and/or the hardware processor 804 of FIG. 8) to ascertain LTE synchronization data 104 associated with an LTE signal 106.

An NR signal analyzer 108 that is executed by at least one hardware processor (e.g., the hardware processor 602 of FIG. 6, and/or the hardware processor 804 of FIG. 8) may ascertain NR synchronization data 110 associated with an NR signal 112.

A multi-path profile generator 114 that is executed by at least one hardware processor (e.g., the hardware processor 602 of FIG. 6, and/or the hardware processor 804 of FIG. 8) may perform, for the LTE synchronization data 104, LTE analysis. The multi-path profile generator 114 may perform, for the NR synchronization data 110, NR analysis. The multi-path profile generator 114 may determine, based on the LTE analysis and the NR analysis, a multi-path profile 116 of the LTE signal 106 and the NR signal 112.

The multi-path profile generator 114 may perform, for the LTE synchronization data 104, the LTE analysis by performing LTE time domain correlation using an LTE reference signal.

The multi-path profile generator 114 may perform, for the NR synchronization data 110, the NR analysis by performing NR time domain correlation using an NR Primary Synchronization signal (PSS) and Secondary Synchronization signal (SSS).

The multi-path profile generator 114 may generate, based on the multi-path profile 116 of the LTE signal 106 and the NR signal 112, a display 118 (e.g., a multi-path profile display) of the multi-path profile 116 of the LTE signal 106 and the NR signal 112.

A Dynamic Spectrum Sharing (DSS) channel mapper 120 that is executed by the at least one hardware processor (e.g., the hardware processor 602 of FIG. 6, and/or the hardware processor 804 of FIG. 8) may perform, for the LTE synchronization data 104, a further LTE analysis. The DSS channel mapper 120 may perform, for the NR synchronization data 110, a further NR analysis. Further, the DSS channel mapper 120 may determine, based on the further LTE analysis and the further NR analysis, LTE and NR channels 122.

The DSS channel mapper 120 may perform, for the LTE synchronization data 104, the further LTE analysis by performing single-sideband (SSB), physical broadcast channel (PBCH), reference signal (RS), physical downlink control channel (PDCCH), and physical downlink shared channel (PDSCH) analysis. Further, the DSS channel mapper 120 may generate (or update), based on the further LTE analysis, a channel allocation display 124.

The DSS channel mapper 120 may perform, for the NR synchronization data 110, the further NR analysis by performing single-sideband (SSB), physical broadcast channel-demodulation reference signals (PBCH-DMRS), physical downlink control channel (PDCCH), and physical downlink shared channel (PDSCH) analysis. Further, the DSS channel mapper 120 may generate (or update), based on the further NR analysis, a channel allocation display 124.

The NR signal analyzer 108 may ascertain, by using an NR raster function 126, the NR synchronization data 110 associated with the NR signal 112.

Figure 2:
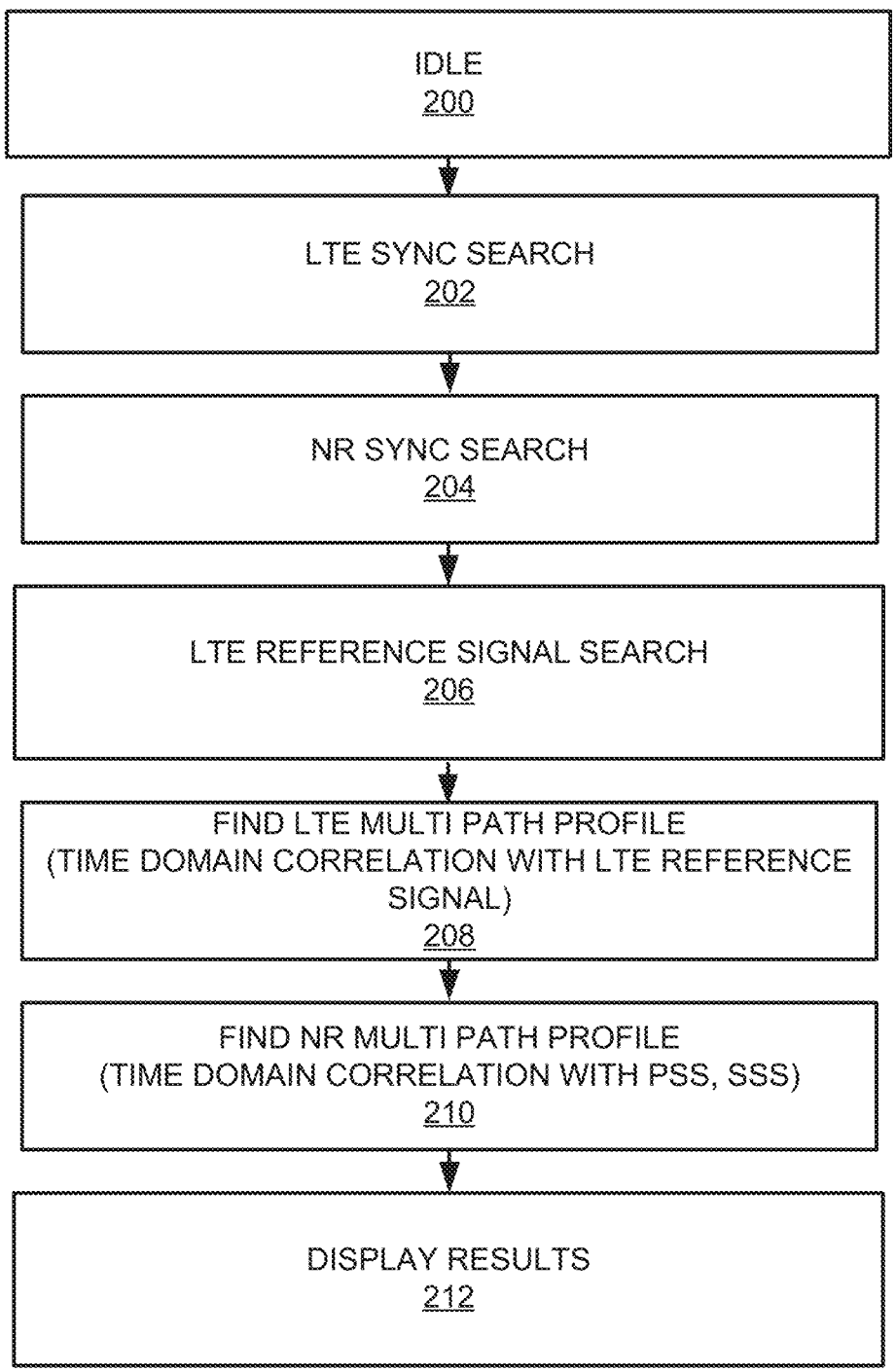
FIG. 2 illustrates a logical flow of a Dynamic Spectrum Sharing (DSS) multi-path profile operation of the NR and LTE signal concurrent testing apparatus of FIG. 1, according to an example of the present disclosure.

FIG. 2 illustrates a logical flow of a DSS multi-path profile operation of the apparatus 100, according to an example of the present disclosure.

Referring to FIG. 2, at block 202, the LTE signal analyzer 102 may be invoked from an idle state at block 200, to an active state. In the active state, the LTE signal analyzer 102 may obtain LTE synchronization data 104. For example, the LTE signal analyzer 102 may perform a search to obtain the LTE synchronization data 104.

At block 204, the NR signal analyzer 108 may obtain NR synchronization data 110. For example, the NR signal analyzer 108 may perform a search to obtain the NR synchronization data 110. In this regard, the NR signal analyzer 108 may determine whether the NR synchronization data 110 is on a DSS application.

At block 206, if the NR synchronization data 110 is on the DSS application, the multi-path profile generator 114 may perform an LTE reference signal search (e.g., the LTE signal 106).

With respect to blocks 202-206, as disclosed herein, the multi-path profile generator 114 may perform, for the NR synchronization data 110, the NR analysis by performing NR time domain correlation using an NR PSS and SSS. The PSS may represent a value from the frequency domain.

In order to generate a display in the time domain, the multi-path profile generator 114 may perform an inverse fast Fourier transform (IFFT). The multi-path profile generator 114 may perform correlation using the PSS IFFT value at approximately 10 ms.

Equation 1 may represent the correlation expression as follows:

$$Xx+Xyj=\Sigma_{k=0}^{n}(Rx+Ryj)^{k}*(Px-Pyj)^{k} \quad \text{(Equation 1)}$$

For Equation 1, Rx is the real value of the received data, Ry is an imaginary value of the received data, Px is the real value of the PSS data, and Py is an imaginary value of the PSS data. The n value may represent the integral coefficient, and the multi-path profile generator 114 may perform correlation (as described below) using this value. With respect to correlation, the maximum value may represent the position of the PSS. In this regard, when operating for 10 ms by using the apparent diffusion coefficient (ADC) result value, if sampling at 30.72 Mhz, 307200 data points are obtained. The 307200 points of data may include real and imaginary values of Rx and Ry. For 2048 correlations that are performed at this location, using this value, the position of the largest value out of 307200 in Equation 2 below may be determined.

Figure 3A:
FIG. 3A illustrates power versus time.
Figure 3B:
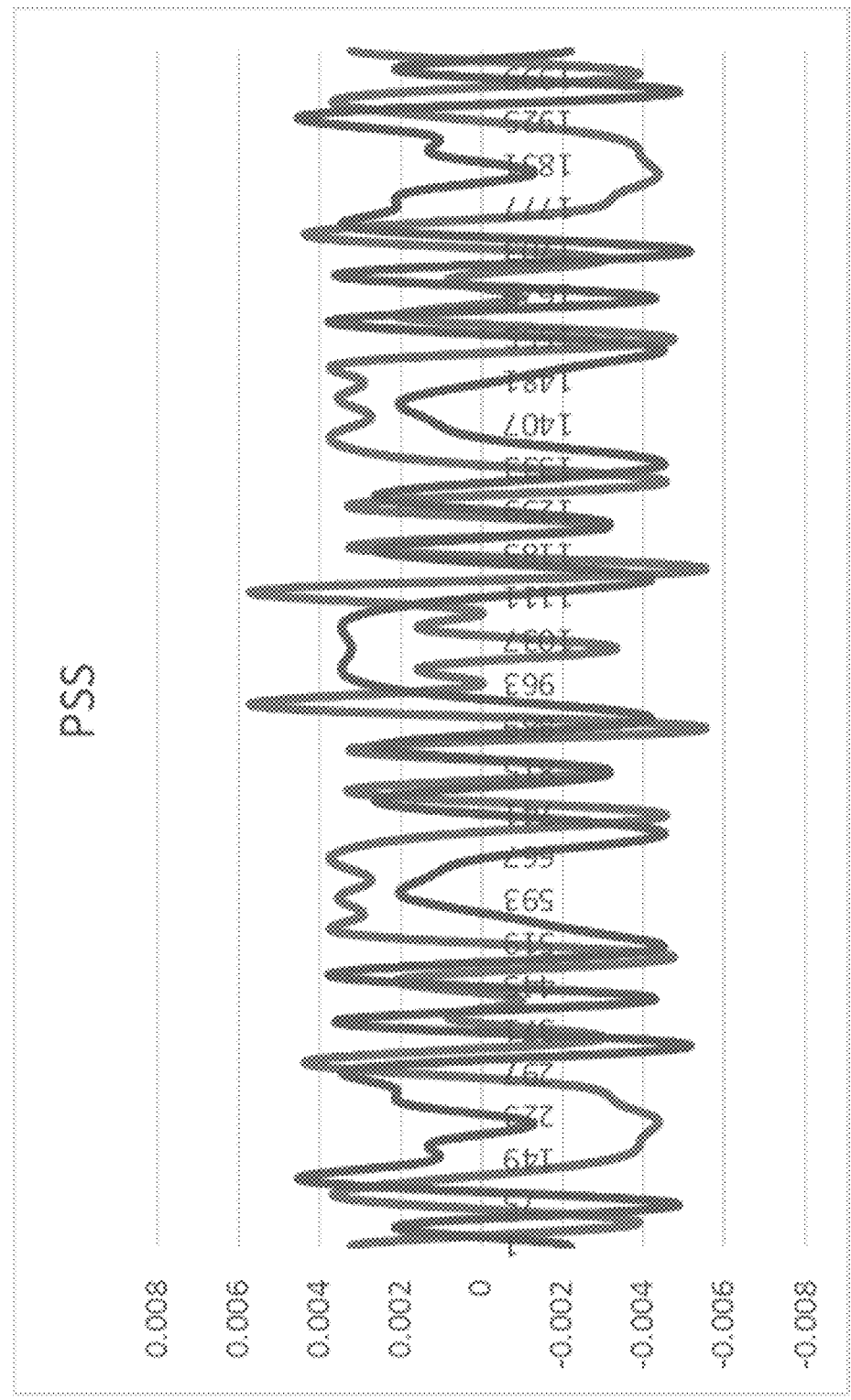
FIG. 3B illustrates a PSS display.

FIG. 3A illustrates power versus time, where data for 10 ms is shown. Rx and Ry appear to be 307200, and this value is the result of 10 log 10(Rx*Rx+RyRy). FIG. 3B illustrates a PSS display, where IFFT result value in case of LTE PSS 0 correlation is performed using this value.

The maximum value may be determined using Equation 2 as follows:

$$\text{Power } X=\text{MAX}((Xx+Xyj)*(Xx-Xyj)) \quad \text{(Equation 2)}$$

For Equation 2, correlation values may include real and imaginary values. Power X may determine the absolute value and report the largest value. The location of this value may also be reported. The position with respect to Equation 2 may represent a position of the PSS. If the number of Px and Py values is 2048 and the received data is Rx and Ry, for the resulting 307200 values, Equation 1 may include 307200 values, and power may be determined to obtain the largest value among these values. Power may be determined as Xx*Xx+Xy*Xy, and the largest value among 307200 may represent Power X, and the position may represent the position of Power X.

The multi-path profile generator 114 may determine the position, which as described above, is the location (e.g., used to determine SSS, RS, and PBCH) where the correlation value is the largest, of the SSS using the position of the PSS. In order to determine the position of the SSS from the position of the PSS, after performing FFT, in Equation 1, Px may be converted to Sx. For example, Px may be converted to Sx on the value of n of 62. The value may change depending on the Cell identification (ID). Typically, the Cell ID 0 value is {0, 1, 1, 1, −1, 1, 1, 1, 1, 1, −1, 1, 1, −1, −1, −1, −1, −1, −1, 1, −1, 1, 1, 1, 1, −1, 1, 1, 1, −1, −1, −1, −1, −1, −1, 1, −1, −1, 1, −1, 1, −1, −1, 1, 1, −1, 1, 1, −1, 1, 1, 1, 1, −1, 1, −1, −1, −1, 1, 1, 1, −1}]. In order to determine a Cell ID, a maximum value among 168 becomes the value of SSS, and the Cell ID may be determined using this value and the PSS value, which is the maximum value among the three.

Assuming that the PSS ID is Nid(2), SSS ID is Nid(1), the physical cell identity, $N_{ID}^{cell}$, may be defined by the equation:

$$N_{ID}^{CELL} = 3N_{ID}^{(1)} + N_{ID}^{(2)}$$

where $N_{ID}^{(1)}$ is the physical layer cell identity group (0 to 167), and $N_{ID}^{(2)}$ is the identity within the group (0 to 2). This arrangement may create 504 unique physical cell identities.

In this manner, the LTE position, which represents the position where Power X, which has the largest value among 307200 points, appears, and LTE Cell ID of PSS, SSS, and RS may be determined. Fast Fourier transform (FFT) may be performed on each symbol with the found position. The LTE standard may utilize 1.4M/3M/5M/10M/15M/20M bandwidth. If the correct bandwidth is used for one symbol, a maximum of 1272 occurs. For example, for FIG. 5A discussed below, subcarrier will be 623, this value is 10 Mhz bandwidth, 1272 is 20 Mhz bandwidth, and thus 1272 represents the maximum value of the subcarrier. If the total number of symbols is 10 ms, the total number of symbols becomes 14*10=140, and therefore, the number of data points are 140*1272. With respect to symbols, orthogonal frequency-division multiplexing (OFDM) may include a symbol and a subcarrier, as shown in in FIG. 5A (e.g., for 0~55, if this value is originally 1 frame, it is 140).

With respect to NR, the multi-path profile generator 114 may utilize Equations 1 and 2 to determine PSS and SSS, where n is 127. The sequence of PSS 0 of NR is as follows: {1, −1, −1, 1, −1, −1, −1, −1, 1, 1, −1, −1, −1 1, 1, −1, 1, −1, 1, −1, −1 1, 1, −1, −1, 1, 1, 1, 1, −1, −1, 1, −1, −1, 1, −1, 1, −1, −1, −1, 1, −1, 1, 1, 1, −1, −1, 1, −1, 1, 1, 1, −1, 1, 1, 1, 1, −1, 1, 1, −1, 1, 1, −1, −1, 1, −1, 1, 1, −1, −1, −1, 1, −1, −1, −1, −1, −1, −1, 1, 1, −1, −1, −1, 1, −1, −1, 1, 1, 1, −1, 1, −1, 1, 1, −1, 1, −1, −1, 1, −1, 1, −1, 1, 1, 1, 1, −1}]. Equations 1 and 2 may be performed a total of 140*1272 times to determine the maximum value and retain the associated location (e.g., the position of the symbol is 140 and the position difference is 1272, where the position and the value with the maximum value are to be determined). In this regard, first the best position among the first three PSSs may be determined, and the SSS with the best position among 336 SSSs may be determined. As a result of the current test, if the power compared to LTE PSS/SSS is −10 dB or more, a determination may be made as to whether there is PSS of NR. If the PSS power of the NR is −10 dB or less than the LTE PSS/SSS power, it can be said that there is no NR in the DSS.

With respect to PSS of NR, for NR's Cell ID standard, PSS of NR and PSS of LTE are different. For example, for synchronization signals, physical-layer cell identities, there are 1008 unique physical-layer cell identities given by:

$$N_{ID}^{cell} = 3N_{ID}^{(1)} + N_{ID}^{(2)}$$

where $N_{ID}^{(1)} \in \{0, 1, \ldots, 335\}$ and $N_{ID}^{(2)} \in \{0, 1, 2\}$.

Using the found LTE Cell ID, the multi-path profile generator 114 may create an LTE RS, and perform correlation using Equation 3 as follows:

$$\text{Diplay}(\text{Power}(Xx+Xyj)) = \Sigma_{j=0}^{m} \Sigma_{k=0}^{n} (Rtx+Rtyj)^{k+j*} (Px-Pyj)^{k} \quad \text{(Equation 3)}$$

For Equation 3, Rtx and Rty are real and imaginary data of the real received time. Px and Py may represent the results of IFFT of the RS signal. N is a maximum of 2048, m is a multipath length, and a maximum is 512 (e.g., shown at 304 of FIG. 3C).

The PSS data may be obtained from the best PSS location. In the case of LTE PSS, the best PSS location may be based on the maximum position in 307200. The correlation may be performed at the double maximum position, and in the PSS of NR, it may represent the maximum correlation position at the 140*1272 position. The RS location using PSS of LTE location may be specified in the specification and can be found at once. Using this PSS/SSS data of 127, the multi-path profile generator 114 may perform IFFT. When IFFT is performed, the multi-path profile generator 114 may generate data of 2048 time domains. This value may be correlated with the received signal at Equation 3, where N is a maximum of 2048, m is a multipath length, and a maximum is 512.

At block 208, for the LTE reference signal from block 206, for a first phased operation of two phased operations, the multi-path profile generator 114 may perform time domain correlation using the LTE reference signal. In this regard, the multi-path profile generator 114 may determine the multi-path profile 116 of the LTE signal 106 (e.g., the LTE multi-path profile).

Using the determined LTE Cell ID, the multi-path profile generator 114 may create an LTE RS, where LTE uses Cell ID to create RS. Because RS signals may be considered more important than PSS/SSS signals, multipath may be measured using RS signals. Using this RS data of maximum 200, for example, the multi-path profile generator 114 may perform IFFT. When IFFT is performed, the multi-path profile generator 114 may generate data of 2048 time domains. The multi-path profile generator 114 may utilize Equation 3 to correlate this data. Rtx and Rty may represent real and imaginary data of the real received time, Px and Py are the results of IFFT of the RS signal, N is a maximum of 2048, m is a multipath length, and a maximum is 512.

At block 210, for the NR analysis, the multi-path profile generator 114 may perform time domain correlation using the NR PSS and SSS signal. In this regard, the multi-path profile generator 114 may determine the multi-path profile 116 of the NR signal 112 (e.g., the NR multi-path profile).

From the best PSS location (e.g., the PSS value of NR is the position where the maximum value appears) that was determined, the multi-path profile generator 114 may obtain PSS data. Rtx and Rty are real and imaginary data of the real received time. Px and Py are the results of IFFT of the NR PSS and SSS signal. Using this PSS and SSS data of 127, the multi-path profile generator 114 may perform IFFT. When IFFT is performed, the multi-path profile generator 114 may generate data of 2048 time domains. This value may be correlated with the received signal using Equation 3, where N is a maximum of 2048, m is a multipath length, and a maximum is 512.

With respect to the specification of NR, IFFT may be performed on the appropriate values. In this regard, for the primary synchronization signal, and sequence generation, the sequence $d_{PSS}(n)$ for the primary synchronization signal may be defined by $$d_{PSS}(n)=1-2x(m)$$

$$m=(n+43N_{ID}^{(2)}) \bmod 127$$

$$0 \leq n < 127$$

where $$x(i+7)=(x(i+4)+x(i)) \bmod 2$$

and $$[x(6)\ x(5)\ x(4)\ x(3)\ x(2)\ x(1)\ x(0)]=[1\ 1\ 1\ 0\ 1\ 1\ 0]$$

With respect to mapping to physical resources, for the secondary synchronization signal, the sequence $d_{SSS}(n)$ for the secondary synchronization signal is defined by $$d_{SSS}(n) = [1 - 2x_0((n + m_0) \bmod 127)][1 - 2x_1((n + m_1) \bmod 127)]$$

$$m_0 = 15 \left\lfloor \frac{N_{ID}^{(1)}}{112} \right\rfloor + 5 N_{ID}^{(2)}$$

$$m_1 = N_{ID}^{(1)} \bmod 112$$

$$0 \leq n < 127$$

where $$x_0(i+7)=(x_0(i+4)+x_0(i)) \bmod 2$$

$$x_1(i+7)=(x_1(i+1)+x_1(i)) \bmod 2$$

and $$[x_0(6)\ x_0(5)\ x_0(4)\ x_0(3)\ x_0(2)\ x_0(1)\ x_0(0)]=[0\ 0\ 0\ 0\ 0\ 0\ 1]$$

$$[x_1(6)\ x_1(5)\ x_1(4)\ x_1(3)\ x_1(2)\ x_1(1)\ x_1(0)]=[0\ 0\ 0\ 0\ 0\ 0\ 1]$$

Figure 3C:
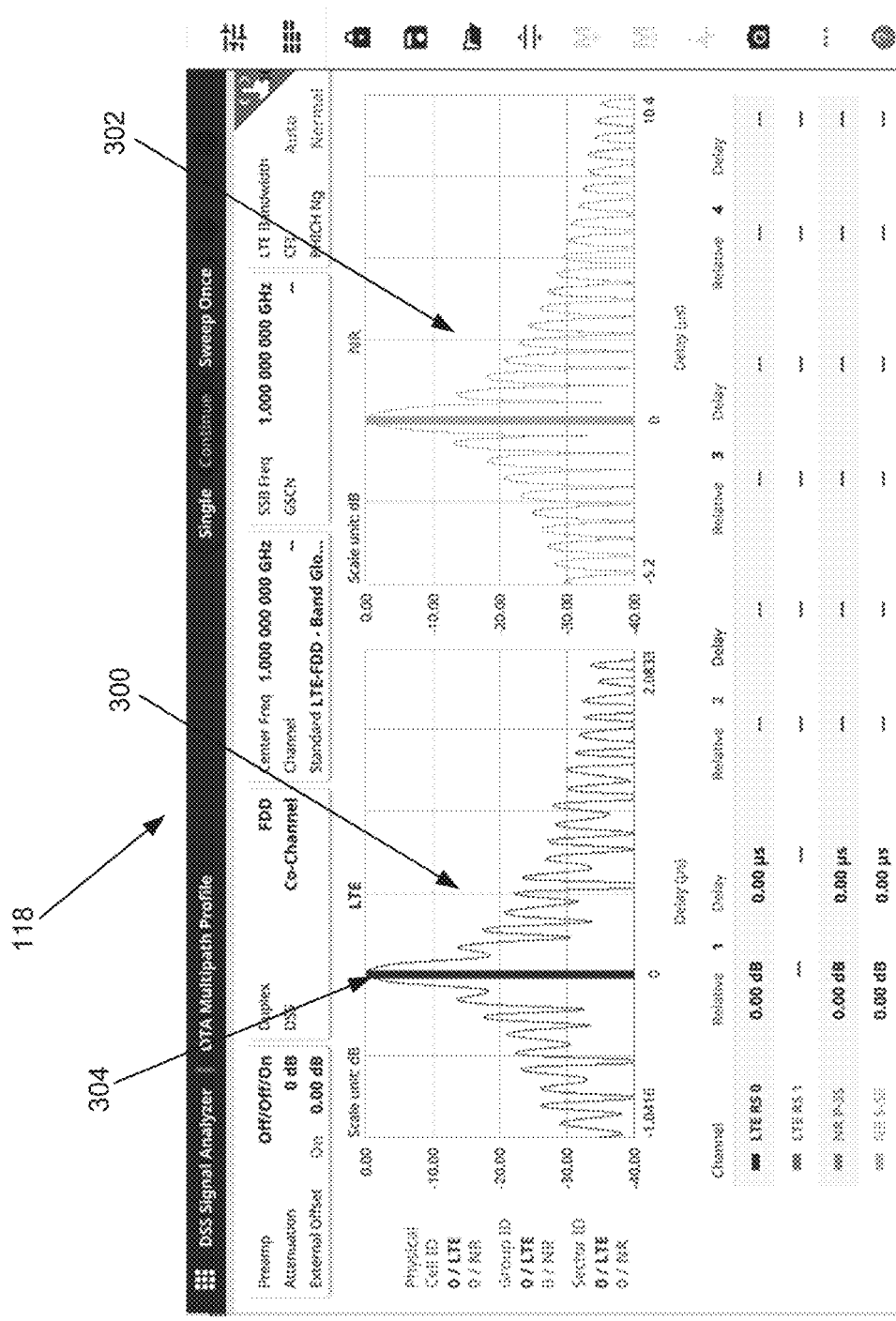
FIGS. 3C-3E illustrate results displays of operation of the DSS multi-path profile operation of FIG. 2, according to an example of the present disclosure.
Figure 3D:
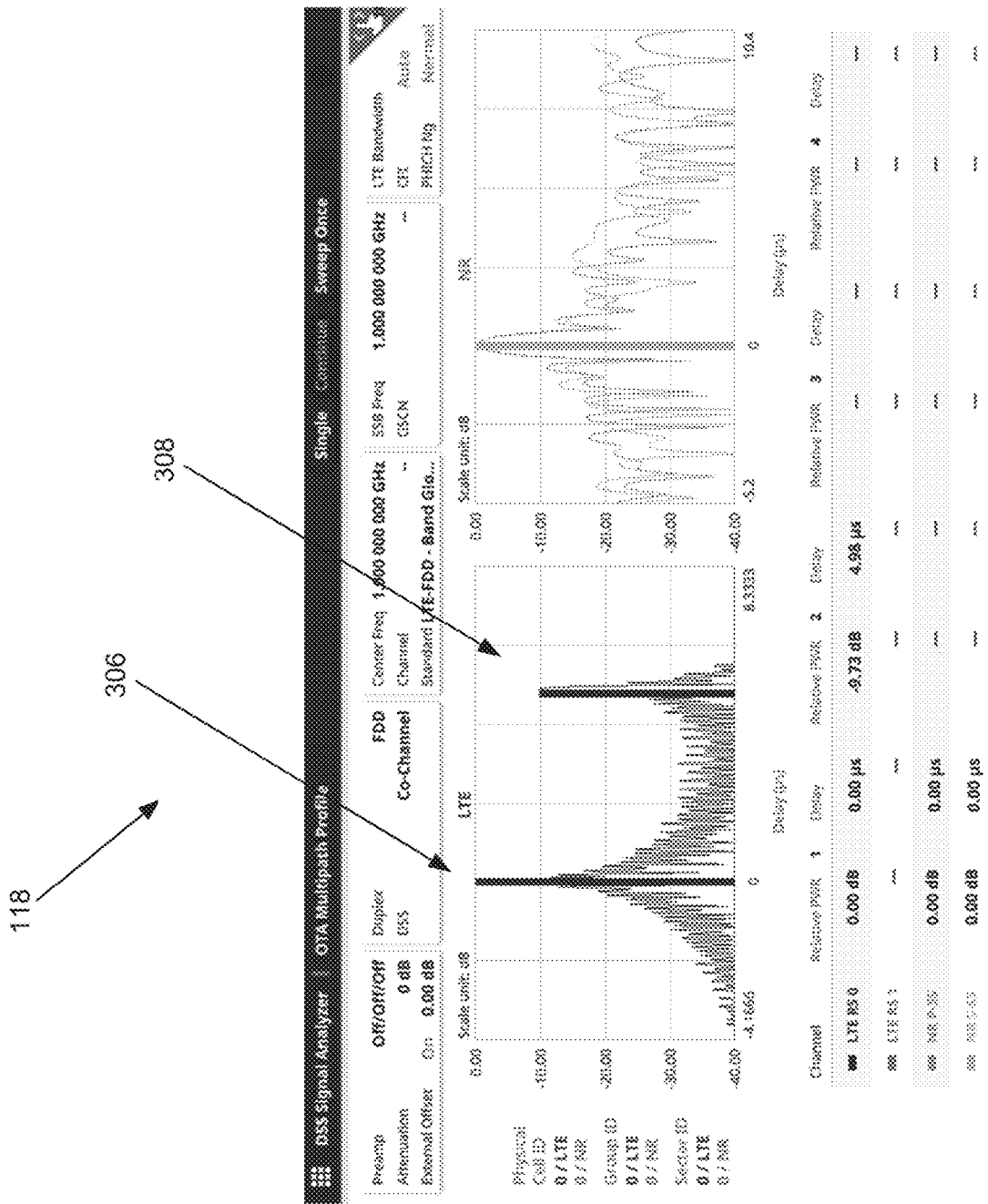
Figure 3E:
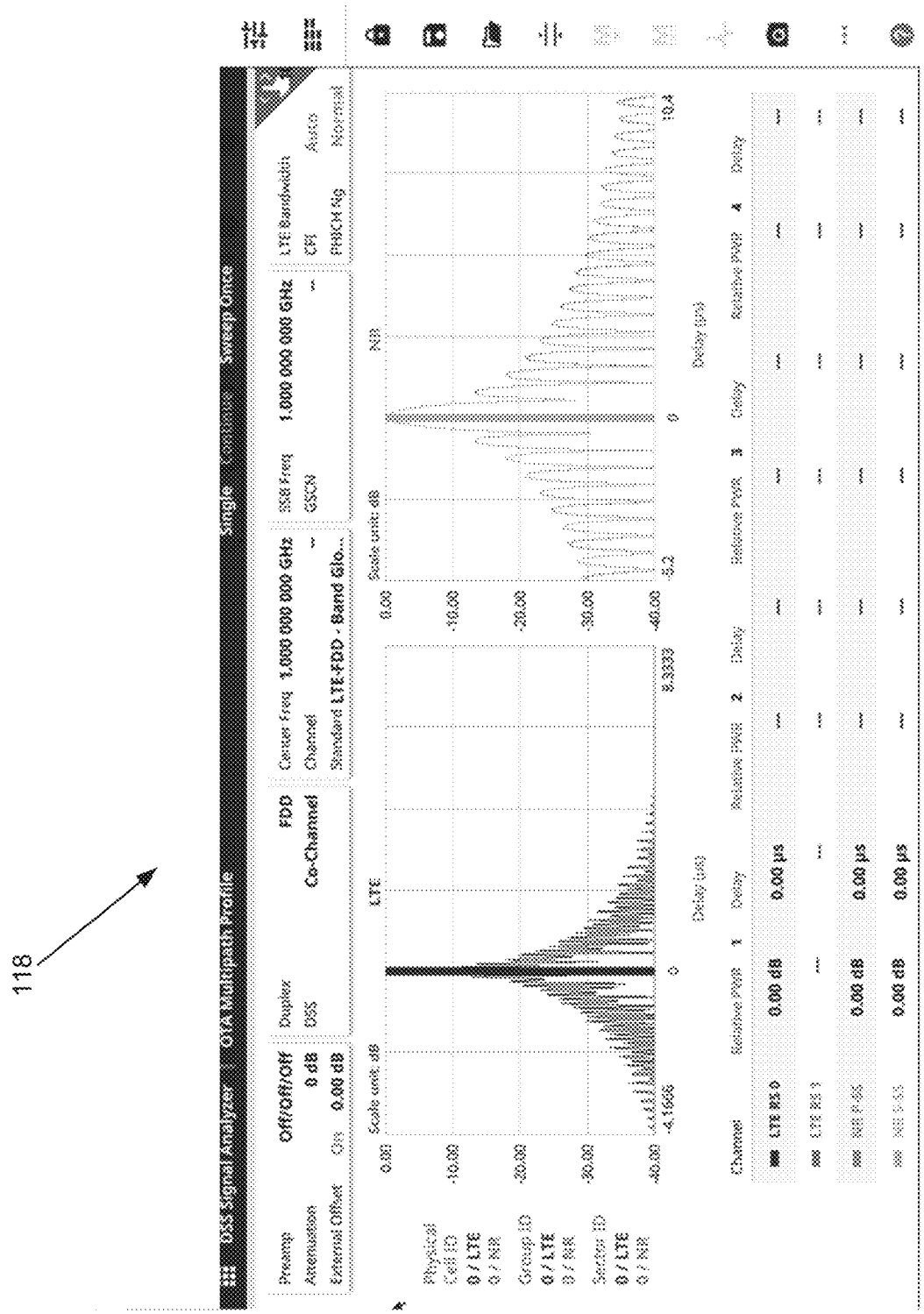

The correlation result shows the relationship between propagated signals. If there is only one direct signal, this means that the base station is well installed, and thus, no modification is needed. In this regard, FIGS. 3C and 3E show one multipath, both being within the specification, and thus there is no need for a modification. FIG. 3D has multipath at 4.98 us, which requires modification. However, for two paths, a delay may be evaluated. If the delay is greater than 4.68 μs (which is the cyclic prefix (CP) value), the antenna direction of the base station should be adjusted. In this regard, the direction of the base station's antenna may be adjusted so that only one multipath comes out or the delay is 4.68 μs. The multi-path profile generator 114 may generate an indication or alert to a user of the apparatus 100 to adjust or to maintain an antenna direction of a base station (not shown). Alternatively or additionally, the multi-path profile generator 114 may generate an indication or alert to control an antenna controller 128 to automatically (e.g., without user intervention) control an antenna direction of the base station, or the base station, until one multipath comes out or the delay is 4.68 μs (or another specified value). Thus, the antenna direction may be automatically moved as needed by the antenna controller 128, where the aforementioned functionality of the multi-path profile generator 114 may be iteratively evaluated until one multipath comes out or the delay is 4.68 μs (or another specified value).

At block 212, the multi-path profile generator 114 may generate a display 118 of results of the LTE multi-path profile and the NR multi-path profile determined at blocks 208 and 210.

FIGS. 3C-3E illustrate results displays of operation of the DSS multi-path profile operation of FIG. 2, according to an example of the present disclosure.

Referring to FIG. 3C, the LTE multi-path profile and the NR multi-path profile determined at blocks 208 and 210 are displayed at 300 and 302. FIG. 3C shows only one multipath, and thus, no base station and/or antenna modification may need to be performed. FIG. 3D shows two multipaths at 306 and 308, and thus a base station and/or antenna modification may need to be performed, such that the base station and/or antenna may need to be adjusted to the profile shown in FIG. 3E.

Figure 4:
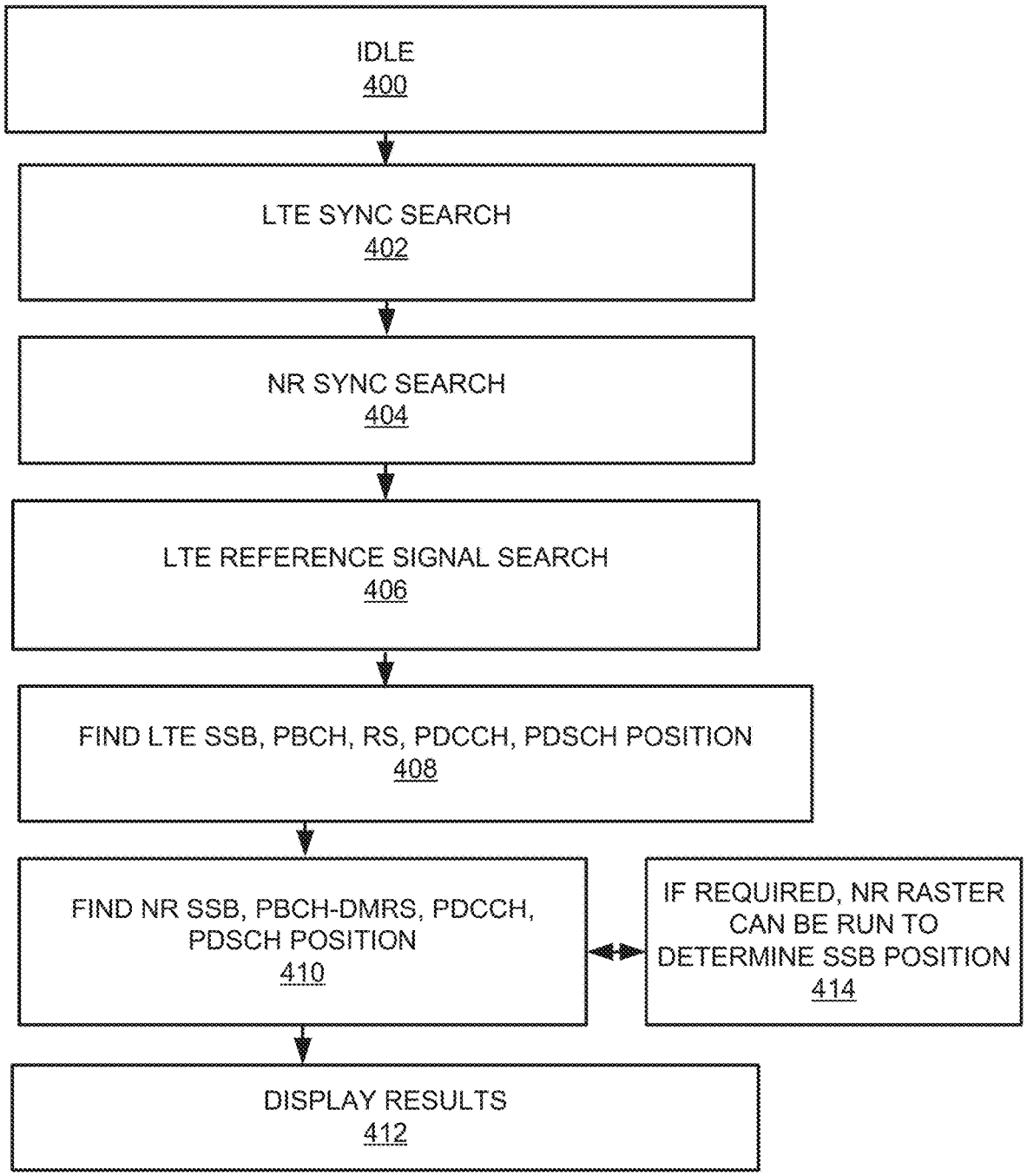
FIG. 4 illustrates a logical flow of a DSS channel mapper of the NR and LTE signal concurrent testing apparatus of FIG. 1, according to an example of the present disclosure.

FIG. 4 illustrates a logical flow of a DSS channel mapper 120 of the apparatus 100, according to an example of the present disclosure.

Referring to FIG. 4, at block 402, the LTE signal analyzer 102 may be in invoked from an idle state at block 400, to an active state. In the active state, the LTE signal analyzer 102 may obtain LTE synchronization data 104. For example, the LTE signal analyzer 102 may perform a search to obtain the LTE synchronization data 104.

At block 404, the NR signal analyzer 108 may obtain NR synchronization data 110. For example, the NR signal analyzer 108 may perform a search to obtain the NR synchronization data 110. In this regard, the NR signal analyzer 108 may determine whether the NR synchronization data 110 is on a DSS application.

At block 406, if the NR synchronization data 110 is on the DSS application (e.g., that includes the PSS signal of NR), the multi-path profile generator 114 may perform an LTE reference signal search (e.g., the LTE signal 106).

At block 408, for the LTE reference signal from block 406, for a first phased operation of two phased operations, the DSS channel mapper 120 may perform the SSB, PBCH, RS, PDCCH, and PDSCH analysis operation. Further, the DSS channel mapper 120 may generate (or update) the channel allocation display 124.

At block 410, for the NR analysis, the DSS channel mapper 120 may perform the SSB, PBCH-DMRS, PDCCH, and PDSCH analysis operation. Further, the DSS channel mapper 120 may generate (or update) the channel allocation screen.

In order to determine whether the base station is sending the radio waves properly in case of LTE, the DSS channel mapper 120 may detect SSB including PSS, SSS, and PBCH. If the base station is installed incorrectly and no radio waves are emitted, the base station will not be visible in the DSS channel mapper 120, and also does not represent PCI values. In this regard, the base station and/or antenna may need to be adjusted as disclosed herein so that the base station is properly sending radio waves.

If the PCI value and SSB (PSS, SSS, PBCH) are properly detected, there is no LTE transmission problem in the physical layer of the base station. The PDCCH or PDSCH of LTE appears only when data is transmitted. Therefore, it may or may not appear in the channel allocation display 124.

In order to determine SSB for NR detection, if the SSB of NR were not found and only LTE was transmitted, the base station did not transmit DSS, but transmitted LTE. Also, it may be that the antenna of the base station is installed incorrectly, or pointed in an incorrect direction. In this case, the antenna of the base station may need to be adjusted or a check may be performed as to whether the base station transmits correctly. The PDCCH or PDSCH of NR may appear when data is transmitted. Therefore, it may or may not appear in the channel allocation display 124.

At block 412, the DSS channel mapper 120 may display results of the LTE multi-path profile and the NR multi-path profile determined at blocks 208 and 210.

At block 414, the NR synchronization data may be located in a position other than the center frequency. In this case, the DSS channel mapper 120 may perform an additional search process to determine the synchronization data using an NR raster function. Thus, at block 414, the DSS channel mapper 120 may perform an NR raster function to determine an SSB position.

In order determine LTE Sync and NR Sync, if LTE sync cannot be found, then the DSS channel mapper 120 may determinate if the base station is transmitting data properly. For example, after comparing the power of PSS and the power of SSS, and determining if there is a difference of more than −10 dB the DSS channel mapper 120 may determine whether there is a signal-to-noise ratio of 1 dB or more. If the NR Sync cannot be found, the DSS channel mapper 120 may determine if the base station is transmitting data, for example, by determining whether it is −10 dB greater than the PSS power of LTE.

The NR raster function may be performed in the frequency and subcarrier domains. The NR raster function may be used to perform a correlation to find the highest value.

If data is being transmitted properly, the DSS channel mapper 120 may detect RS and SSB of LTE. This value gives the PCI value. After comparing the power of PDCCH and PDSCH of LTE based on the RS power value, if the value is greater than −10 dB, the DSS channel mapper 120 may indicate this value in the channel allocation display 124. If the value is −10 dB less than the RS Power value, it is not displayed. For example, if RS is not displayed, this may mean that the base station is not working or it is far away from the antenna.

For NR, the PSS may be found by subcarrier (e.g., 140*1272 are found by correlation). The DSS channel mapper 120 may determine the correlation value based on the largest value, and determine whether it is greater than the RS power of LTE by −10 dB or more. Next, the position with the largest value and the largest value among the three is determined. In this regard, SSS may also find the largest value out of 336, and the position with the largest value. If the power of NR PSS/SSS, PBCH, PDCCH, and PDSCH is greater than −10 dB than that of LTE RS, it is displayed in the channel allocation display 124. If the power of NR PSS/SSS, PBCH, PDCCH, and PDSCH is less than −10 dB, it is not displayed in the channel allocation display 124.

Figure 5A:
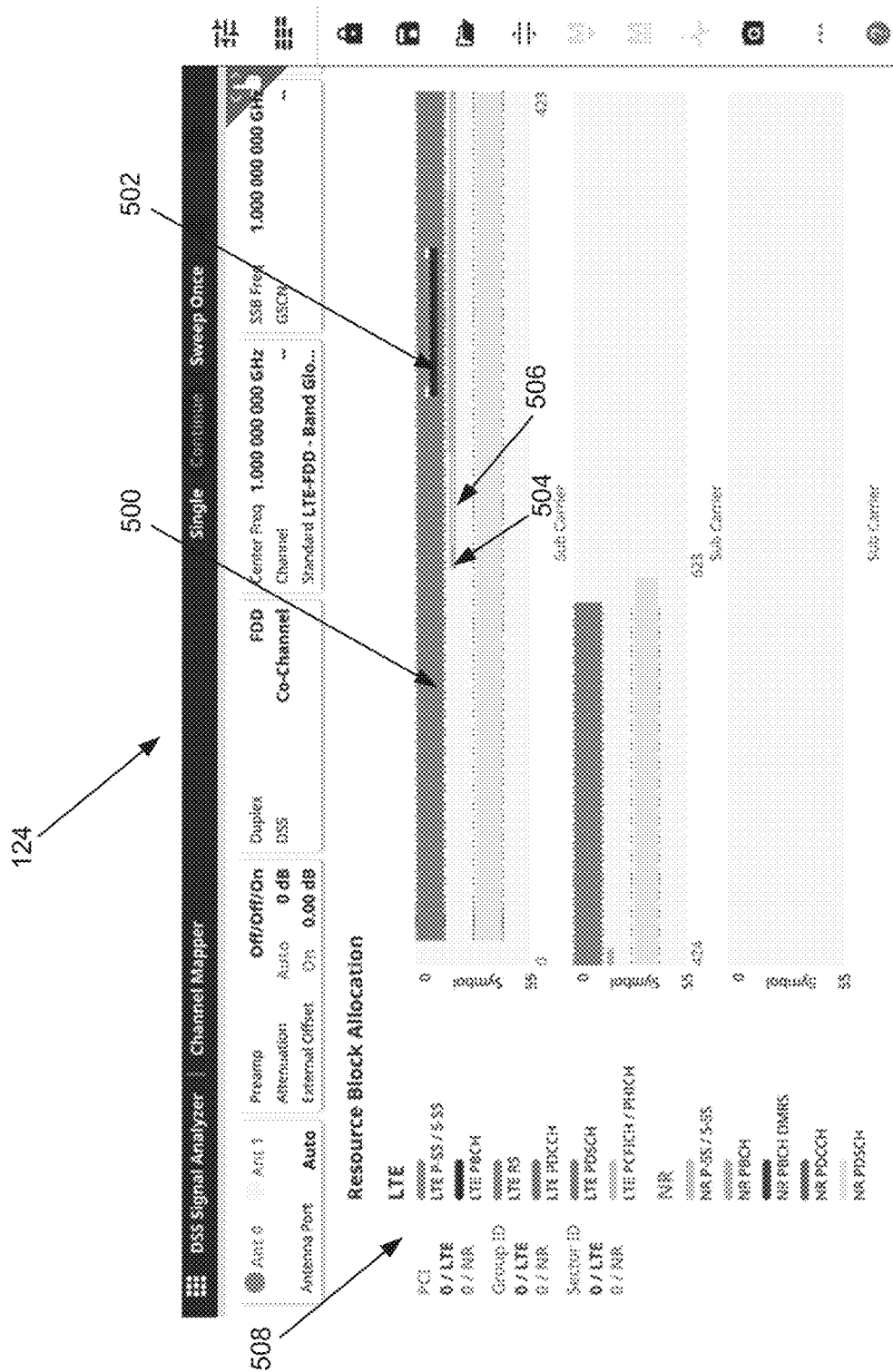
FIGS. 5A-5C illustrate results displays of operation of the DSS channel mapper of FIG. 4, according to an example of the present disclosure.
Figure 5B:
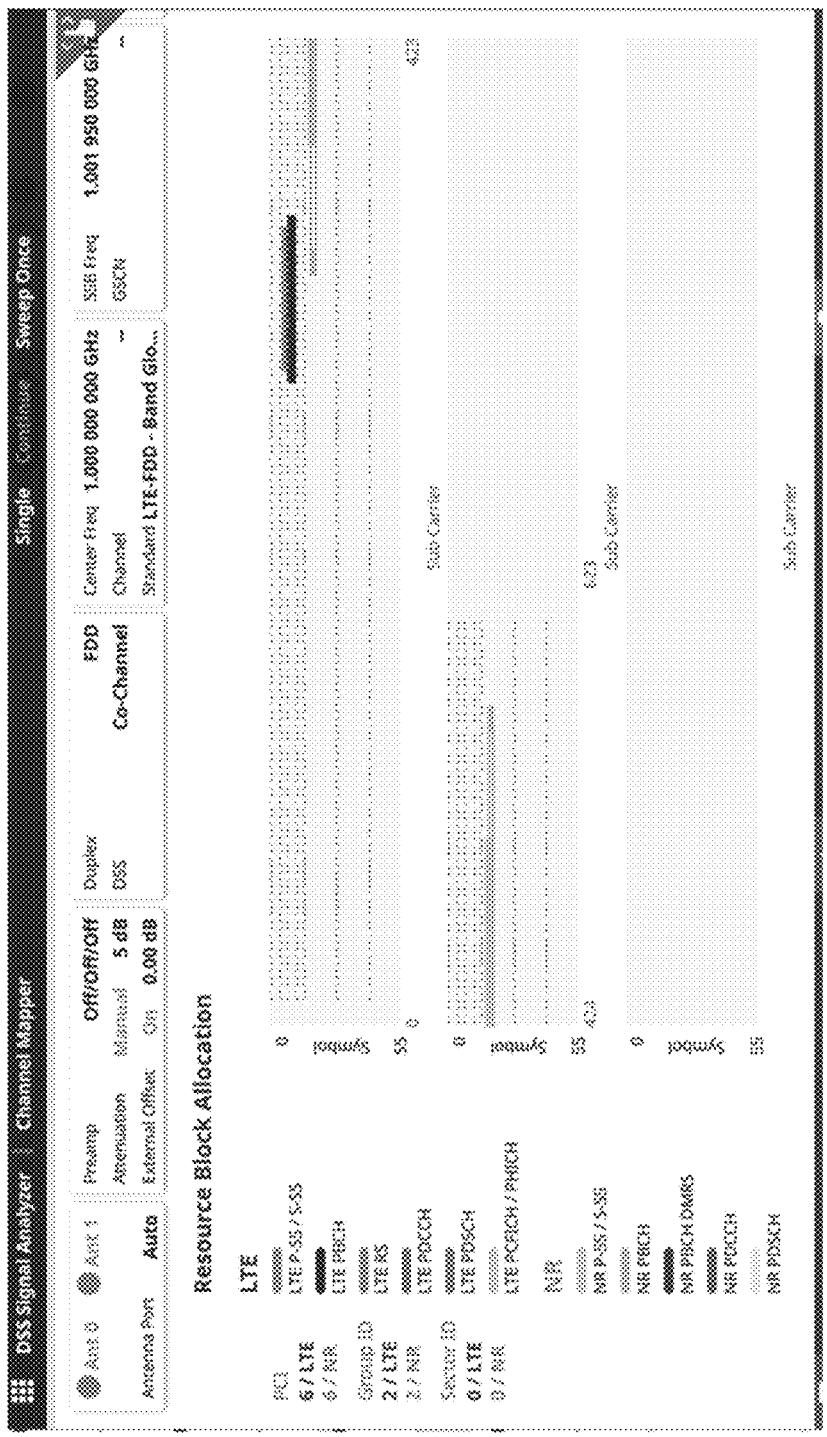
Figure 5C:
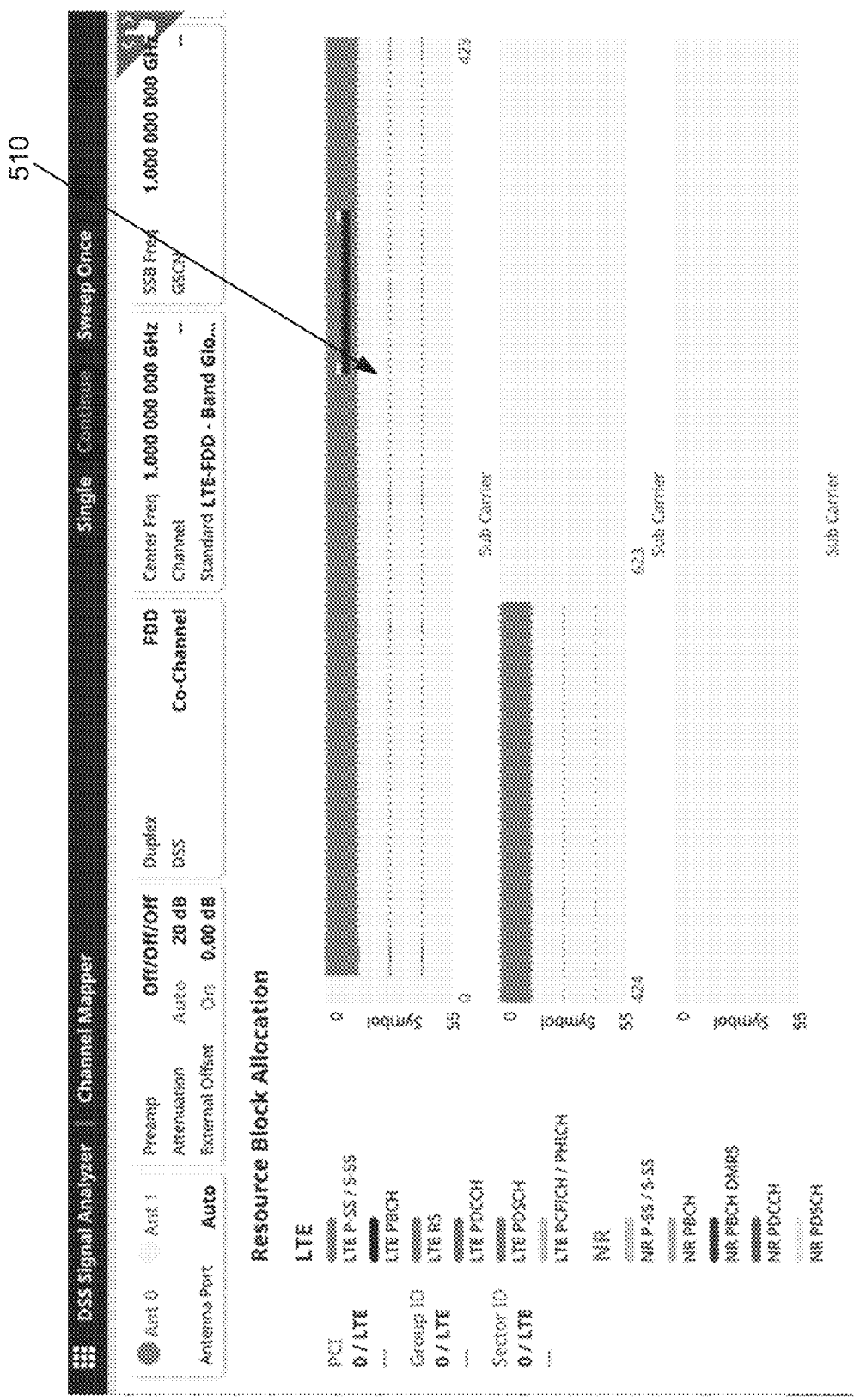

FIGS. 5A-5C illustrate results displays of operation of the DSS channel mapper 120 of FIG. 4, according to an example of the present disclosure.

Referring to FIG. 5A, for an LTE PDSCH channel 500 and an LTE PBCH channel 502, corresponding NR PBCH channel 504 and NR PDSCH channel 506 are shown. Thus, the DSS channel mapper 120 may generate (or update) the channel allocation display 124 to include both LTE and NR channel information. The different LTE and NR channels that may be displayed are shown at 508. In this regard, FIGS. 5A and 5B show a base station and antenna that are operating properly, and FIG. 5C includes a base station and/or antenna that is not operating properly. In this regard, the DSS channel mapper 120 may generate an indication or alert to control the antenna controller 128 to automatically (e.g., without user intervention) control an antenna direction of the base station, or the base station. FIG. 5C shows the channel allocation display 124 when the base station and/or antenna have an error in the operation of NR in DSS. When operating as in FIG. 5C the base station is likely to have a fault (e.g., not operating properly). This is because the PCI of NR is shown as a blank display at 510 (e.g., "-----" as shown). Also, NR PSS/SSS, NR PBCH, NR PBCH DMRS, NR PDCCH, and NR PDSCH are not displayed in the channel allocation display 124. Therefore, a determination may need to be made as to whether the base station and/or antenna is operating the DSS properly. For example, a fault may have occurred with respect to the antenna of the base station, or it may be more likely that a fault has occurred with respect to the base station.

Figure 6:
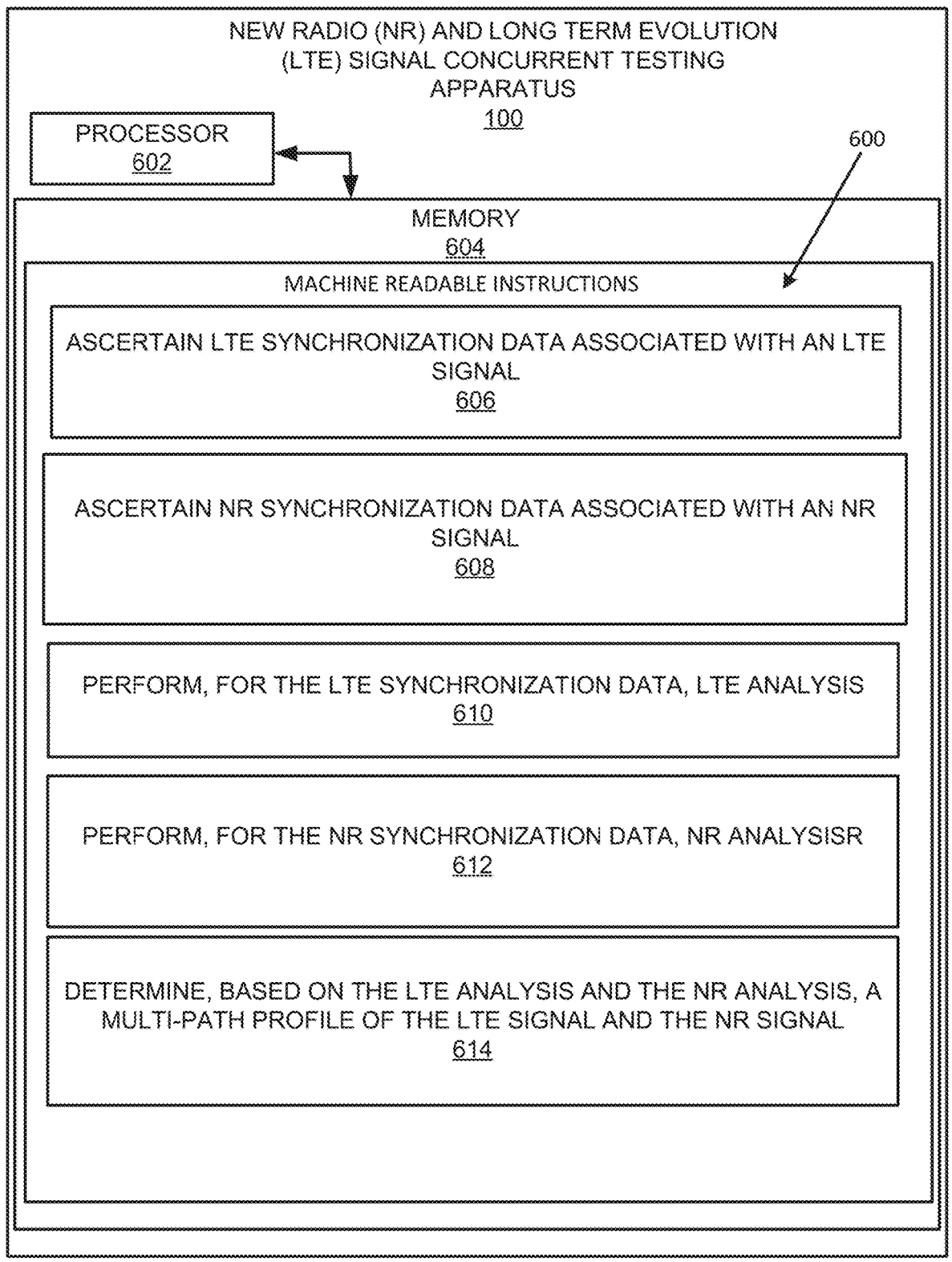
FIG. 6 illustrates an example block diagram for NR and LTE signal concurrent testing, in accordance with an example of the present disclosure.
Figure 7:
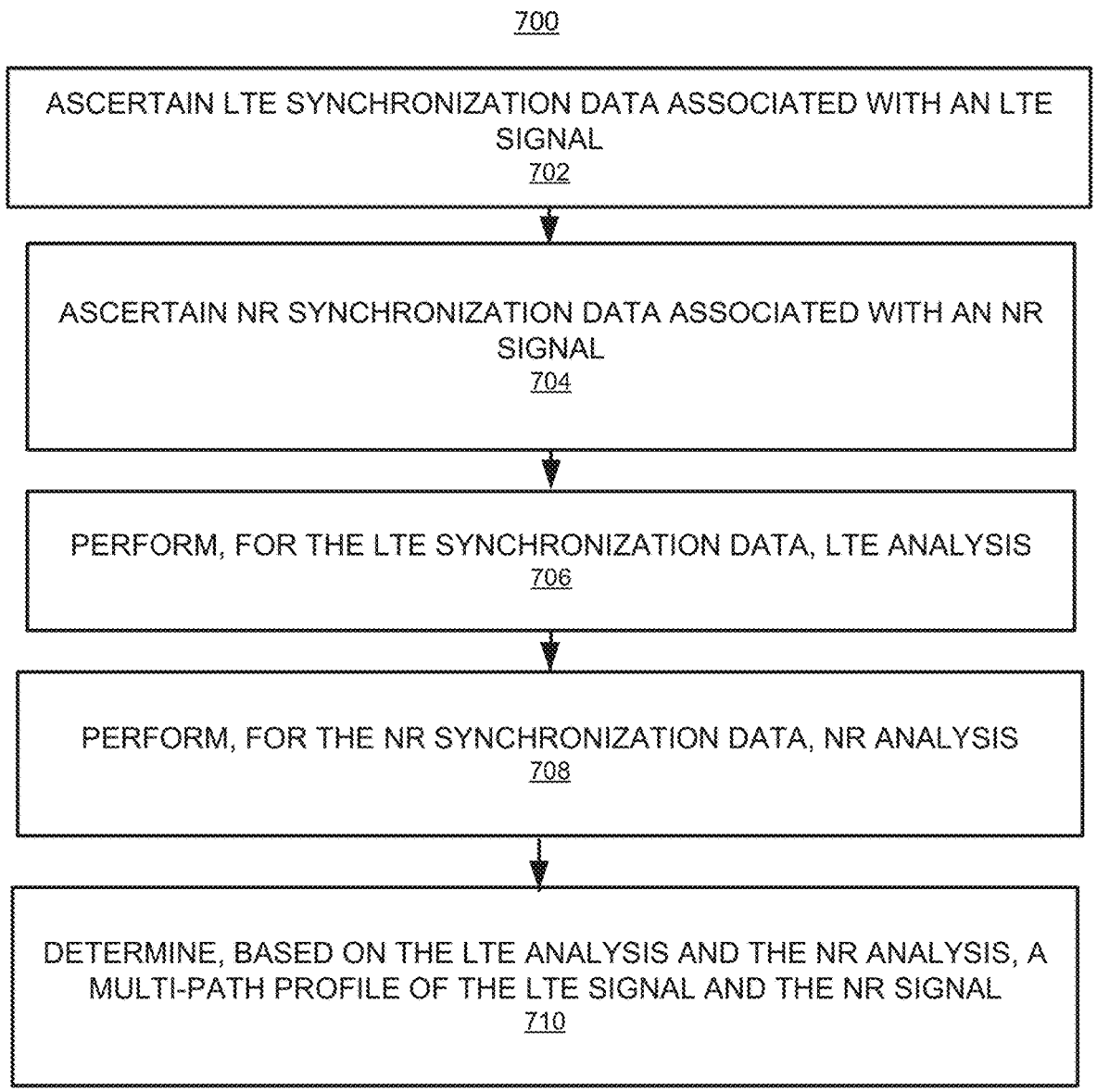
FIG. 7 illustrates a flowchart of an example method for NR and LTE signal concurrent testing, in accordance with an example of the present disclosure.
Figure 8:
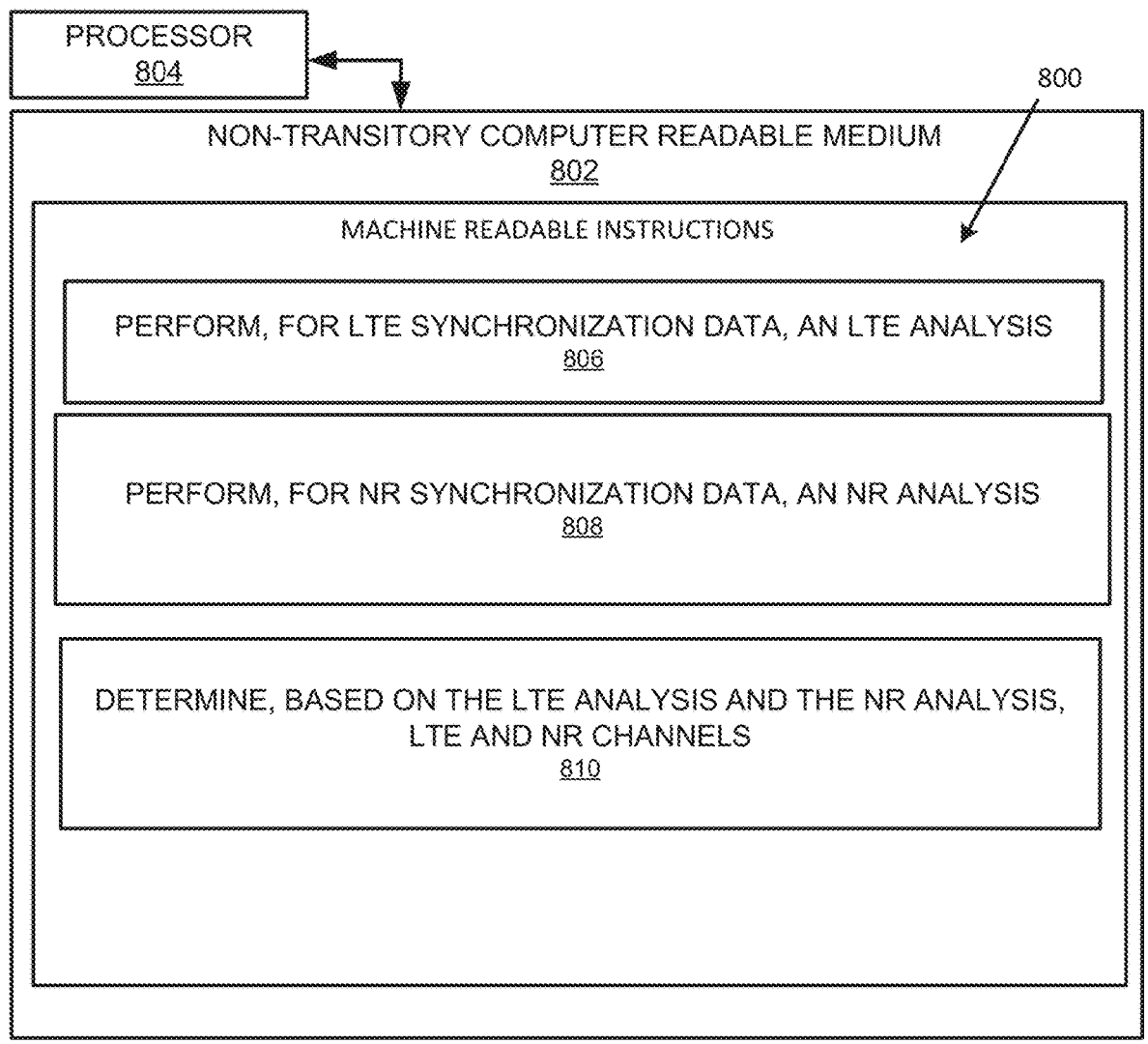
FIG. 8 illustrates a further example block diagram for NR and LTE signal concurrent testing, in accordance with another example of the present disclosure.

FIGS. 6-8 respectively illustrate an example block diagram 600, a flowchart of an example method 700, and a further example block diagram 800 for NR and LTE signal concurrent testing, according to examples. The block diagram 600, the method 700, and the block diagram 800 may be implemented on the apparatus 100 described above with reference to FIG. 1 by way of example and not of limitation. The block diagram 600, the method 700, and the block diagram 800 may be practiced in other apparatus. In addition to showing the block diagram 600, FIG. 6 shows hardware of the apparatus 100 that may execute the instructions of the block diagram 600. The hardware may include a processor 602, and a memory 604 storing machine readable instructions that when executed by the processor cause the processor to perform the instructions of the block diagram 600. The memory 604 may represent a non-transitory computer readable medium. FIG. 7 may represent an example method for NR and LTE signal concurrent testing, and the steps of the method. FIG. 8 may represent a non-transitory computer readable medium 802 having stored thereon machine readable instructions to provide NR and LTE signal concurrent testing according to an example. The machine readable instructions, when executed, cause a processor 804 to perform the instructions of the block diagram 800 also shown in FIG. 8.

The processor 602 of FIG. 6 and/or the processor 804 of FIG. 8 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 802 of FIG. 8), such as hardware storage devices (e.g., RAM (random access memory), ROM (read only memory), EPROM (erasable, programmable ROM), EEPROM (electrically erasable, programmable ROM), hard drives, and flash memory). The memory 604 may include a RAM, where the machine readable instructions and data for a processor may reside during runtime.

Referring to FIGS. 1-6, and particularly to the block diagram 600 shown in FIG. 6, the memory 604 may include instructions 606 to ascertain LTE synchronization data 104 associated with an LTE signal 106.

The processor 602 may fetch, decode, and execute the instructions 608 to ascertain NR synchronization data 110 associated with an NR signal 112.

The processor 602 may fetch, decode, and execute the instructions 610 to perform, for the LTE synchronization data 104, LTE analysis.

The processor 602 may fetch, decode, and execute the instructions 612 to perform, for the NR synchronization data 110, NR analysis.

The processor 602 may fetch, decode, and execute the instructions 614 to determine, based on the LTE analysis and the NR analysis, a multi-path profile 116 of the LTE signal 106 and the NR signal 112.

Referring to FIGS. 1-5 and 7, and particularly FIG. 7, for the method 700, at block 702, the method may include ascertaining LTE synchronization data 104 associated with an LTE signal 106.

At block 704, the method may include ascertaining NR synchronization data 110 associated with an NR signal 112.

At block 706, the method may include performing, for the LTE synchronization data 104, LTE analysis.

At block 708, the method may include performing, for the NR synchronization data 110, NR analysis.

At block 710, the method may include determining, based on the LTE analysis and the NR analysis, a multi-path profile 116 of the LTE signal 106 and the NR signal 112.

Referring to FIGS. 1-5 and 8, and particularly FIG. 8, for the block diagram 800, the non-transitory computer readable medium 802 may include instructions 806 to perform, for LTE synchronization data 104, an LTE analysis.

The processor 804 may fetch, decode, and execute the instructions 808 to perform, for the NR synchronization data 110, an NR analysis.

The processor 804 may fetch, decode, and execute the instructions 810 to determine, based on the LTE analysis and the NR analysis, LTE and NR channels 122.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A New Radio (NR) and Long Term Evolution (LTE) signal concurrent testing apparatus comprising:
   at least one hardware processor;
   an LTE signal analyzer, executed by the at least one hardware processor, to ascertain LTE synchronization data associated with an LTE signal; and
   a multi-path profile generator, executed by the at least one hardware processor, to:
      perform, for the LTE synchronization data, LTE analysis; and
      determine, based on the LTE analysis, a multi-path profile of the LTE signal.

2. The NR and LTE signal concurrent testing apparatus of claim 1, further comprising:
   an NR signal analyzer, executed by the at least one hardware processor, to
      ascertain NR synchronization data associated with an NR signal, wherein the multi-path profile generator is executed by the at least one hardware processor to:
      perform, for the NR synchronization data, NR analysis; and
      determine, based on the NR analysis, a multi-path profile of the NR signal.

3. The NR and LTE signal concurrent testing apparatus of claim 1, wherein the multi-path profile generator is executed by the at least one hardware processor to perform, for the LTE synchronization data, the LTE analysis by:
   performing LTE time domain correlation using an LTE reference signal.

4. The NR and LTE signal concurrent testing apparatus of claim 2, wherein the multi-path profile generator is executed by the at least one hardware processor to perform, for the NR synchronization data, the NR analysis by:
   performing NR time domain correlation using an NR Primary Synchronization signal (PSS) and Secondary Synchronization signal (SSS).

5. The NR and LTE signal concurrent testing apparatus of claim 2, wherein the multi-path profile generator is executed by the at least one hardware processor to:
   generate, based on the multi-path profile of the LTE signal and the NR signal, a display of the multi-path profile of the LTE signal and the NR signal.

6. The NR and LTE signal concurrent testing apparatus of claim 2, further comprising:
   a Dynamic Spectrum Sharing (DSS) channel mapper, executed by the at least one hardware processor, to:
      perform, for the LTE synchronization data, a further LTE analysis;
      perform, for the NR synchronization data, a further NR analysis; and
      determine, based on the further LTE analysis and the further NR analysis, LTE and NR channels.

7. The NR and LTE signal concurrent testing apparatus of claim 6, wherein the DSS channel mapper is executed by the at least one hardware processor to perform, for the LTE synchronization data, the further LTE analysis by:
   performing single-sideband (SSB), physical broadcast channel (PBCH), reference signal (RS), physical downlink control channel (PDCCH), and physical downlink shared channel (PDSCH) analysis; and
   generating, based on the further LTE analysis, a channel allocation display.

8. The NR and LTE signal concurrent testing apparatus of claim 6, wherein the DSS channel mapper is executed by the at least one hardware processor to perform, for the NR synchronization data, the further NR analysis by:
   performing single-sideband (SSB), physical broadcast channel-demodulation reference signals (PBCH-DMRS), physical downlink control channel (PDCCH), and physical downlink shared channel (PDSCH) analysis; and
   generating, based on the further NR analysis, a channel allocation display.

9. The NR and LTE signal concurrent testing apparatus of claim 6, wherein the NR signal analyzer is executed by the at least one hardware processor to:
   ascertain, by using an NR raster function, the NR synchronization data associated with the NR signal.

10. A method for NR and LTE signal concurrent testing, the method comprising:
    ascertaining, by at least one hardware processor, NR synchronization data associated with an NR signal; and
    performing, by the at least one hardware processor, for the NR synchronization data, NR analysis; and
    determining, by the at least one hardware processor, based on the NR analysis, a multi-path profile of the NR signal.

11. The method for NR and LTE signal concurrent testing according to claim 10, further comprising:

ascertaining, by the at least one hardware processor, LTE synchronization data associated with an LTE signal; and performing, by the at least one hardware processor, for the LTE synchronization data, LTE analysis; and determining, by the at least one hardware processor, based on the LTE analysis, a multi-path profile of the LTE signal.

12. The method for NR and LTE signal concurrent testing according to claim 11, wherein performing, for the LTE synchronization data, the LTE analysis further comprises:

performing, by the at least one hardware processor, LTE time domain correlation using an LTE reference signal.

13. The method for NR and LTE signal concurrent testing according to claim 10, wherein performing, for the NR synchronization data, the NR analysis further comprises:

performing, by the at least one hardware processor, NR time domain correlation using an NR Primary Synchronization signal (PSS) and Secondary Synchronization signal (SSS).

14. The method for NR and LTE signal concurrent testing according to claim 11, further comprising:

generating, by the at least one hardware processor, based on the multi-path profile of the LTE signal and the NR signal, a display of the multi-path profile of the LTE signal and the NR signal.

15. The method for NR and LTE signal concurrent testing according to claim 11, further comprising:

performing, by the at least one hardware processor, for the LTE synchronization data, a further LTE analysis;

performing, by the at least one hardware processor, for the NR synchronization data, a further NR analysis; and determining, by the at least one hardware processor, based on the further LTE analysis and the further NR analysis, LTE and NR channels.

16. The method for NR and LTE signal concurrent testing according to claim 15, wherein performing, by the at least one hardware processor, for the LTE synchronization data, the further LTE analysis further comprises:

performing, by the at least one hardware processor, single-sideband (SSB), physical broadcast channel (PBCH), reference signal (RS), physical downlink control channel (PDCCH), and physical downlink shared channel (PDSCH) analysis; and generating, by the at least one hardware processor, based on the further LTE analysis, a channel allocation display.

17. A non-transitory computer readable medium having stored thereon machine readable instructions, the machine readable instructions, when executed by at least one hardware processor, cause the at least one hardware processor to:

perform, for LTE synchronization data, an LTE analysis; and determine, based on the LTE analysis, an LTE channel.

18. The non-transitory computer readable medium according to claim 17, wherein the machine readable instructions, when executed by the at least one hardware processor, further cause the at least one hardware processor to:

perform, for NR synchronization data, an NR analysis; and determine, based on the NR analysis, an NR channel.

19. The non-transitory computer readable medium according to claim 17, wherein the machine readable instructions to perform, for the LTE synchronization data, the LTE analysis, when executed by the at least one hardware processor, further cause the at least one hardware processor to:

perform single-sideband (SSB), physical broadcast channel (PBCH), reference signal (RS), physical downlink control channel (PDCCH), and physical downlink shared channel (PDSCH) analysis; and generate, based on the LTE analysis, a channel allocation display.

20. The non-transitory computer readable medium according to claim 18, wherein the machine readable instructions to perform, for the NR synchronization data, the NR analysis, when executed by the at least one hardware processor, further cause the at least one hardware processor to:

perform single-sideband (SSB), physical broadcast channel-demodulation reference signals (PBCH-DMRS), physical downlink control channel (PDCCH), and physical downlink shared channel (PDSCH) analysis; and generate, based on the NR analysis, a channel allocation display.

* * * * *